United States Patent Office 3,187,013
Patented June 1, 1965

---

3,187,013
CATALYTIC CONDENSATION OF DI-HYDRO-CARBON SUBSTITUTED ALKYNES
Harold H. Zeiss and Minoru Tsutsui, Dayton, Ohio, assignors to Monsanto Company, a corporation of Delaware
No Drawing. Filed June 17, 1960, Ser. No. 36,703
23 Claims. (Cl. 260—346.1)

The present invention is directed to the highly catalytic cyclic polymerization of organic compounds containing unsaturated triple carbon-to-carbon bonds in the presence of covalent cobalt compounds, particularly di-covalent, hydrocarbon substituted cobalt compounds.

The invention is also directed to bis-arene-$\pi$-complexes of cobalt (I), as new compounds, per se, and also to the methods for preparing these $\pi$-complexes.

The primary aspect of the invention concerns the catalytic cyclization of di-hydrocarbon substituted, non-alpha alkynes (alkynes other than 1-alkynes) to hexa-substituted benzenes.

In another aspect, the invention concerns the preparation of bis-arene-$\pi$-complexes of cobalt (I) and involves the cyclic condensation of di-hydrocarbon substituted acetylenes on di-covalently bonded, di-hydrocarbon cobalt compounds.

In still another aspect the invention is directed to the process of reacting together a cobalt halide, magnesium, an organic halide capable of forming a Grignard reagent, and an acetylene containing no acidic hydrogen (a non-alpha-alkyne) to catalytically obtain hexa-substituted arenes and bis-arene-$\pi$-complexes of cobalt (I).

The invention is further directed to di-hydrocarbon substituted, di-covalently bonded cobalt compounds solvated with tetrahydrofuran, the same being useful in the condensation reaction for cyclically condensing non-alpha-alkylenes to substituted benzenes.

The primary object of this invention is to cyclically condense, in a highly catalytic manner, di-substituted acetylenes to yield hexa-substituted benzenes. A further object of this invention is to prepare covalent, di-hydrocarbon cobalt compounds in stable form.

Another object of this invention is to provide a method of synthesis of bis-arene-$\pi$-complexes of cobalt (I).

*Preparation of di-covalent, di-hydrocarbon substituted cobalt compounds, bis-arene-$\pi$-complexes of cobalt (I), and cyclic condensation of hexa-substituted benzenes*

The overall synthesis of the above-named compounds can be regarded as taking place either in an overall reaction or stepwise. The following equation depicts, in stepwise fashion, the concomitant preparation of both the bis-arene-$\pi$-complexes of cobalt (I) and the hexa-substituted benzenes.

Equation I:

(Step I)   RX + Mg $\longrightarrow$ R=MgX (Step II)  RMgX + CoCl$_2$ $\xrightarrow{\text{THF}}$ R$_2$Co(THF)$_n$ (Step III) R$_2$Co(THF)$_n$ + R'—C≡C—R' $\xrightarrow{\text{THF}}$

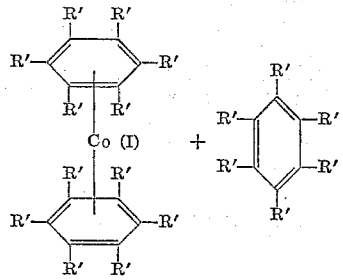

wherein

R = a monovalent hydrocarbon radical
X = a Grignard halogen
THF = tetrahydrofuran
$n$ = no. of moles of tetrahydrofuran complexed in the di-covalent solvate compound
R' = a monovalent hydrocarbon radical Of course in the above-noted equation it will be understood that the "R'" substituents on each acetylenic carbon atom of the "R'—C≡C—R'" non-alpha alkyne are often the same, but they can be different substituents.

As shown by Equation I the above-named synthesis may be viewed as taking place in three steps. Step I illustrates the reaction between the Grignard-forming hydrocarbon halide "RX" with magnesium metal to form the "RMgX" Grignard reagent. Step II depicts the reaction between the "RMgX" Grignard reagent, as formed in Step I, and the cobalt halide in the presence of the solvating agent, e.g., tetrahydrofuran, to yield the di-covalent, di-hydrocarbon substituted, tetra-hydrofuran-solvated cobalt compound, R$_2$Co(THF)$_n$. Step III illustrates the reaction of the di-covalent, tetrahydrofuran solvated cobalt compound with the di-hydrocarbon substituted acetylene to yield the bis-arene-$\pi$-complex of cobalt (I) plus the hexa-substituted benzene.

The process according to the invention is capable of converting any aliphatic or aromatic halogen compound, as long as said compound is capable of forming a Grignard reagent in the normal manner, into di-organo cobalt compounds containing covalent carbon-to-carbon bonds. As exemplary of suitable aryl compounds suitable for forming such Grignard reagents the following can be named: phenyl bromide; 1,4-dibromobenzene; 1,2-dibromobenzene; p-bromotoluene; p-iodotoluene; p-bromostyrene; p-bromo-alpha-methylstyrene; bromomesitylene; phenylchloride; alpha - bromonaphthalene; beta-bromonaphthalene; alpha-bromoanthracene; beta-bromophenathrene; p-diethylamino bromobenzene; meta-bromotoluene; ortho-bromotoluene; 1-bromo-4-chlorobenzene; alpha-bromotetralin; pentamethylbromobenzene; meta-fluorobromobenzene; p-ethylbromobenzene; p-butyl bromobenzene; p-isobutyl bromobenzene; p-sec-butylbromobenzene; p-t-butylbromobenzene; p-hexylbromobenzéne; p-phenylbromobenzene, etc.

As will be apparent from the above compounds, the method of this aspect of the present invention is applicable to halogenated aryl hydrocarbons and to other aryl halogen compounds which do not contain active hydrogen atoms, unsaturated carbon-to-oxygen bonds, or other functional groups capable of destroying or reacting with Grignard reagents. Aliphatic halogen compounds can also be employed according to the instant invention.

As exemplary of the suitable aliphatic halogen compounds the following are named as compounds from which Grignard reagents can be prepared and which are useful in preparing aliphatic di-covalent cobalt compounds; methyl chloride; ethyl chloride; ethyl bromide; propyl chloride; isopropyl chloride; allyl chloride; butyl chloride; t-butyl chloride; vinyl chloride; propenyl bromide; pentyl bromide; hexyl chloride; octyl chloride; etc. The halogen compounds of aliphatic hydrocarbons, e.g., alkyl halides, are especially suitable.

As regards the monovalent alkyl hydrocarbon radicals attached to metal by carbon-to-metal bonding, those straight or branched-chain alkyl radicals containing about 1 to 20 carbon atoms will ordinarily be employed; particularly those in the range of 1 to 10 or so carbon atoms, for example, methyl, ethyl, n-propyl, isopropyl, n-butyl, isobutyl, sec-butyl, t-butyl, n-pentyl (and each of its isomers), n-hexyl, n-heptyl, n-octyl, 2-ethylhexyl, nonyl, decyl, dodecyl, tridecyl (from Oxo process), octadecyl, eicosyl, etc.

Cycloalkyl halogen compounds may also be employed in the preparation of the "RMgX" Grignard reagents, and will lead to the formation of di-cycloalkyl substituted di-covalent cobalt compounds. As exemplary of suitable cycloalkyl radicals, cyclopentyl, cyclohexyl, etc., can most conveniently be employed. It is also possible to utilize unsaturated cycloaliphatics, e.g., cyclopentadienyl, The straight chain aliphatics can also be unsaturated, e.g., vinyl, allyl, etc. groups being suitable.

The above compounds (hydrocarbon halides useful in forming the Grignard reagents) as schematically shown by Step I of Equation I are listed as merely exemplary of those hydrocarbon halides which can be employed according to the present invention.

The RMgX Grignard reagents produced in Step I are then reacted with the cobalt halides in Step II to produce the di-covalent, di-hydrocarbon cobalt compounds which are solvated with tetrahydrofuran. The term "solvated" as employed herein is intended to designate molecular bonding or association of a type similar to, but not necessarily identical to, that involved in hydrates of chemical compounds. The tetrahydrofuran, although its exact behavior in the above di-covalent compound is not entirely understood, is essential to the stability of these di-covalent, di-hydrocarbon substituted cobalt compounds.

*Preparation of di-covalent cobalt II compounds*

The process of preparing the di-covalent, di-hydrocarbon substituted tetrahydrofuran solvated cobalt compounds as previously illustrated by Step II of Equation I takes place according to the mechanism

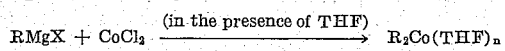

wherein R is a monovalent organic radical, which is attached to the cobalt in the designated product by covalent bonding (carbon to metal bonding); X is a Grignard halogen; and THF represents tetrahydrofuran. While the particular "R," or hydrocarbon substituent, may be selected from a large variety of hydrocarbon substituents; a particular example employing the mesitylmagnesium bromide Grignard reagent is given according to the following equation.

Equation II:

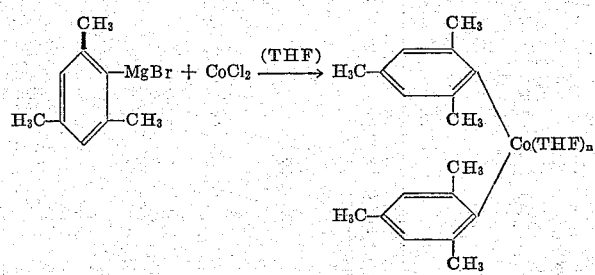

*Concomitant preparation of hexasubstituted benzenes and bis-arene-π-complexes of cobalt (I) by contact-di-hydrocarbon substituted acetylenes with di-covalently bonded cobalt (II) tetrahydrofuranates*

The polymerization reactions of the present invention are generally conducted in the presence of tetrahydrofuran, but any other solvating (complexing) agent may be employed as long as the solvating agent chosen is capable of complexing the di-covalent cobalt compounds to assure a fairly stable form thereof. The actual synthesis of the bis-arene-π-complexes of cobalt (I) and the cyclic condensation of hexa-substituted benzenes is believed to occur in the manner illustrated by Step 3 of Equation I, which is reproduced in Equation III employing the mesityl radical as the "R" substituent on the di-covalent compound, as exemplary of a suitable hydrocarbon "R" substituent. It should be noted here that both the "R'" substituents on the benzene moiety in the bis-arene-π-complex and the "R'" substituents of the hexa-substituted benzenes are derived from the "R'" substituents on the di-substituted acetylene. In the equation which follows both of the R' substituents on acetylene will be methyl groups:

Equation III:

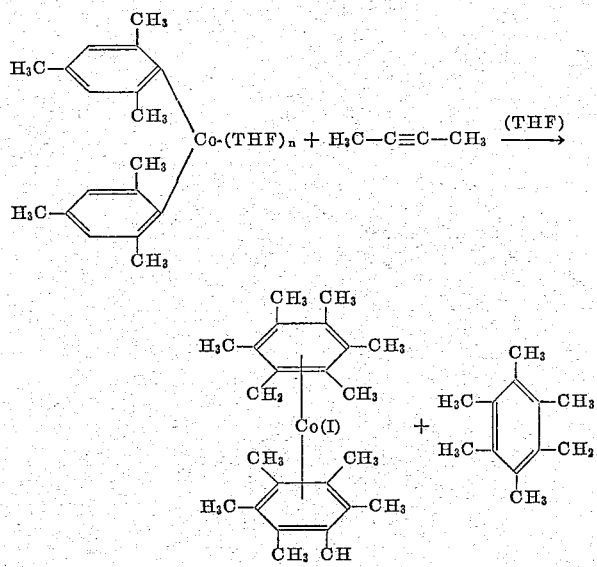

While Equation III illustrates the use of 2-butyne, wherein both of the hydrocarbon substituents on the acetylene moiety are methyl groups, any non-alpha alkyne may be employed. For an acetylene to condense to an aromatic compound according to the present invention, it is necessary that it be di-substituted. Any alkynes other than 1-alkynes are suitable for such purpose, for example, non-alpha alkynes of 4 to 20 or more carbon atoms, particularly the non-alpha alkynes of 4 to 10 carbon atoms can be employed. Suitable alkynes are, for example, those di-substituted acetylenes in which the substituents are any of the straight or branched-chain radicals named hereinabove with respect to suitable alkyl radicals attached to the cobalt in the di-covalent, di-hydrocarbon substituted cobalt compounds; and, in fact, aryl and cyclo-alkyl substituents are also suitable and any of the aryl or cyclo-alkyl radicals named with respect to the cobalt di-covalent compounds above are also suitable substituents for the di-substituted acetylenes. Moreover, acetylenes substituted with heterocyclic substituents are also suitable and produce hexa-substituted benzenes containing heterocyclic substituents. As specific examples of non-alpha alkynes and other di-substituted acetylenes suitable for conversion to substituted benzenes, the following examples can be mentioned: 2-butyne; 2-pentyne; 2-hexyne; 3-hexyne; 2-octyne; 3-octyne; 2,2-dimethyl-3-hexyne; 2-methyl-3-heptyne; 5-decyne; 4-dodecyne; 6-hexadecyne; 2-eicosyne; dicarbethoxy acetylene; diphenyl acetylene; alpha-phenyl-beta-methylacetylene; alpha-phenylmethyl-beta-methyl acetylene; di-alpha-napthyl acetylene; 1-anthracyl-propyne; para-tolylethyl propyne; di-para-tolyl acetylene; alpha-xylyl-beta-methyl acetylene, etc. Various other "R'" hydrocarbon substituents can be employed as long as they do not possess reactive groups which would interfere with π-complex formation and cyclization condensation to substituted benzenes.

The "R'" substituents on the hexa-substituted benzenes may be the same or different. Thus any one of the hydrocarbon substituents which occur in the above named non-alpha alkynes can be present at any one of the six ring carbon atoms on the benzene moiety. Equation III above yields the production of bis(hexamethyl benzene) cobalt (I), and hexamethyl benzene since the hydrocarbon "R'" substituents on the acetylene moiety are both methyl groups.

This overall procedure of preparing the new bis-arene-π-complexes of cobalt (I) from the cyclic condensation of di-hydrocarbon substituted acetylenes on di-covalently bonded, di-hydrocarbon derivatives of cobalt (II) is an important advance in the organo-metallic field because these bis-arene-π-complexes of cobalt (I) have been unattainable either from the Freidel-Crafts type reactions, or by direct synthesis from Grignard reagent and the cobalt (II) halides.

The exact nature of the catalytic effect observed herein is not completely understood. However, the reaction mixture of the cobalt compounds exhibits a powerful catalysis in the cyclic condensation of di-hydrocarbon substituted acetylenes to give a high yield of hexa-substituted benzenes. The following table based on the use of 2-butyne will give evidence to the high percentage yields of the hexa-substituted benzene compound as based upon the cobalt halides, e.g., CoCl$_2$, employed therewith. The fairly constant production of the π-complex would appear to suggest that the π-complex, per se, has something to do with this catalytic action. Thus it may be that both the π-complex and the di-covalently bonded, di-hydrocarbon substituted cobalt compound co-act to produce the high yield of the hexa-substituted benzene. In any event the invention is not limited by these theories (or any other theories) as to the operation thereof.

TABLE I
[Cyclic condensation of 2-butyne with dimesityl cobalt]

| | | | | | |
|---|---|---|---|---|---|
| 2-butyne (mol.) | 6 | 8 | 10 | 20 | 40 |
| CoCl$_2$ (mol.) | 1 | 1 | 1 | 1 | 1 |
| HMB, percent [a] | 50 | 153 | 200 | 480 | 1,000 |
| π-Complex percent [b] | 20 | 20 | 30 | 20 | 20 |

[a] Hexamethyl benzene, yield based on cobalt.
[b] π-Complex-bis(hexamethylbenzene)cobalt (I) tetraphenylboron salt.

As will be noted from Table I the π-complex of cobalt (I) was isolated in the form of its stable tetraphenyl boron salt.

The complexes of cobalt (I) form halide and tetraphenylboron salts readily. Beautiful deep-orange rectangular plates of this tetraphenyl boron salt of bis(hexamethylbenzene) cobalt (I) were crystallized with difficulty from concentrated solutions in methyl ethyl ketone. This π-complex salt analyzed as bis(hexamethylbenzene)-cobalt (I) tetraphenylboron. The magnetic susceptibility examination of the salt showed it to be diamagnetic, the exact value therefore appearing in the following equation. Equation IV:

$$X \frac{293° K.}{mol.} = (-350)\cdot(10^{-6}) \text{ c.g.s.u.}$$

The structure for the bis(hexamethylbenzene)cobalt (I) tetraphenylboron salt is as follows:

*Structure of bis(hexamethylbenzene)-Co(I) tetraphenylboron salt*

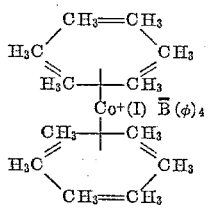

Chemical evidence of this structure is shown by the decomposition of the π-complex cation with lithium aluminum hydride in ether to yield hexamethylbenzene almost quantitatively. Thus the reductive cleavage of the bis(hexamethylbenzene)cobalt (I) yielded the hexamethylbenzenes as expected.

While Equation III, supra, illustrates the use of dimesitylcobalt and 2-butyne, it will be obvious that any other suitable hydrocarbon "R" substituents and any "R'" di-substituted acetylenes may be employed in keeping with the present invention.

The invention will be further illustrated by the example which follows. Of course, it should be understood that this example is not intended to limit the invention, as it is limited only by the claims appended hereto.

*Example 1.*—To a slurried solution of cobaltous chloride (1.30 g., 0.01 mole) in 500 ml. of tetrahydrofuran, 21 ml. of mesitylmagnesium bromide (0.95 mole concentration, 0.02 mole) was added dropwise keeping the reaction temperature below −50° C. A light yellow-green solid precipitated, and the reaction mixture almost solidified. This light yellow-green solid was isolated and determined to be dimesitylcobalt by HgCl$_2$ cleavage. The ratio of mesityl groups to the cobalt atom in the di-covalent compound was 1.64:1. This establishes the presence of 2 mesityl groups per cobalt atom. The reaction mixture from the cobaltous chloride and mesitylmagnesium bromide was shaken vigorously to loosen the solids to a slurried solution. 2-butyne (6–40 mole) was added to the solution at a temperature of −50° C. causing instant decomposition of the yellowish-green material to a brown-black solution. The temperature was gradually raised to room temperature during four hours with efficient stirring, and the mixture was stirred at room temperature overnight. The reaction mixture was refluxed for 30 minutes, and the tetrahydrofuran was then removed under reduced pressure. Ether (150 ml.) was added to the residue, followed by hydrolysis with the addition of 50 ml. of water. The whole mixture was then diluted with 500 ml. of ether and 300 ml. of water. The mixture was then separated into two extracts, one being the ether extract and the other layer being an orange-red water layer. Removal of the solvent from the ether layer left a crystalline material, hexamethylbenzene, which after drying with anhydrous sodium sulphate, was easily recrystallized to constant melting point, 159–162° C. The yield was as shown in Table I above. Then to a portion of the orange-red water layer, an acqueous solution of sodium tetraphenyl boron was added. This yielded a deep orange-red precipitate, bis(hexamethylbenzene)-cobalt (I) tetraphenylboron salt, which recrystallized from methylethyl ketone with difficulty in the form of rectangular plates. This π-complex salt of Co (I) had a melting point of 205–208° C.; and constituted a yield of 20–30% of the π-complex, based upon cobalt.

*Analysis.*—Calcd. for C$_{48}$H$_{56}$CoB: C, 82.04; H, 8.03; Co, 8.39; B, 1.54. Found: C, 82.10; H, 8.17; Co, 8.19; B, 1.49.

The picrate salt of bis(hexamethylbenzene)-Co (I) was prepared by addition of an aqueous solution of sodium picrate to another portion of the orange-red water layer. The π-complex picrate salt was then recrystallized from methylethyl ketone in the form of large golden flakes, and decomposed at 210° C. Analytical calculation for C$_{30}$H$_{38}$CoN$_3$O$_7$: Co, 9.61; N, 6.85. Found: Co, 9.83; N, 6.76.

To a portion of the orange-red water layer separated from the hydrolyzed mixture, 10 g. of sodium chloride was added. The solution was extracted with chloroform to become colorless. After drying with anhydrous sodium sulfate, chloroform was removed under reduced pressure leaving deep orange-red material. The residue was dissolved in 5 ml. of methylethyl ketone, and was then filtered. The repetition of the immediately preceding procedure resulted in the precipitation of a fine orange-red powder, bis(hexamethylbenzene)-Co (I) chloride.

This π-complex chloride salt was present in a yield of 20 to 30%. The chloride π-complex salt was highly hygroscopic. Analytical calculation for C$_{24}$H$_{36}$ClCo: Cl, 8.46. Found: Cl, 8.05.

The bis(hexamethylbenzene)-cobalt (I) chloride was then reductively cleaved with lithium aluminum hydride. The reductive cleavage of the π-complex chloride salt was carried out in 2.51 g. of ether using 1 g. of lithium aluminum hydride and 0.266 g. of bis(hexamethylbenzene)-cobalt (I) chloride. After hydrolysis of the reaction mixture, the solvent was removed from ether solution leaving 0.200 g. of a white crystalline material, hexamethylbenzene, M.P. 155–159° C. These white crystals of hexamethylbenzene formed a picrate complex with an aqueous solution of picric acid, which was identified as hexamethylbenzene picrate by mixed melting point and I.R. analysis. The hexamethylbenzene picrate complex had a melting point of 170° to 173° C. Yield of hexamethylbenzene: Calculated, 0.206 g.; found, 0.200 g. This represents an almost quantitative yield of 97% thus demonstrating the π-complex structure of cobalt (I) by reductive cleavage of the bis(hexamethylbenzene)-cobalt (I) chloride salt to yield hexamethylbenzene.

One especially notable aspect of our invention is the fact that it is possible to react in situ the reagents utilized in preparing the di-covalent, di-hydrocarbon cobalt compounds, including even the magnesium turnings, simultaneously in the same reaction vessel with the di-substituted acetylenic compounds, and obtain both the bis-arene-π-complexes and the hexa-substituted benzene compounds as products substantially as though the various steps of the reaction were conducted separately in stepwise fashion. The importance and value of our invention is apparent from the fact that it provides a highly efficient, truly catalytic synthesis of aromatic molecules by cyclic condensation of dihydrocarbon substituted acetylenes. Acetylenes are, of course, an old and well known class of chemicals and extensive work has been carried out in an effort to find useful condensation reactions for acetylenes. The present discovery now provides a highly efficient, powerfully catalytic procedure for condensing di-substituted acetylenes under mild reaction conditions to obtain specific, tailor-made, identifiable aromatic compounds. As is evident from Table I, supra, the highly efficient rate of production of the hexa-substituted benzenes offers clear evidence as to the value of the invention. It will be noted that the percent recovery of the hexa-substituted benzene compound is 1,000 percent based on $CoCl_2$. Thus, while the exact nature of the catalytic action cannot be pin-pointed to any specific cobalt compound, it becomes apparent that the cobalt compounds exhibit powerful catalysis in the cyclized condensation of di-hydrocarbon substituted acetylenes to hexa-substituted benzenes. Also included within the invention are the di-covalently bonded, di-hydrocarbon substituted cobalt compounds solvated with tetrahydrofuran, the bis-arene-π-complexes of cobalt (I); and the method of obtaining these new compounds.

The present invention, of course, involves a novel reaction rather than specific conditions for carrying out such reactions. However, the following conditions will ordinarily be observed. The mole ratio of di-hydrocarbon substituted, di-covalently bound cobalt compound to acetylenic di-hydrocarbon substituted compound will generally be in the range of about 1:1 to 1:100 or even higher. As noted from Table I, a 1:40 mole ratio of cobalt compound to acetylenic compound has been demonstrated as highly suitable. It is virtually impossible to specify an upper limit for the mole ratio of acetylenic compound due to the extremely high catalytic nature of the reaction. It is generally advisable to have at least 3 moles of acetylenic compound present if the maximum results are to be achieved. The condensation reactions can be carried out generally at temperatures varying from about −50° C., to +70° C., or to about the boiling point of the solvating agent employed. The temperatures employed will depend to some extent upon the specific reactivity of the reagents chosen. The reaction can conveniently be effected by mixing the reactants at lower temperatures and completing the reaction at higher temperatures. Temperatures of the order of 10° to 30° C. or so, or approximately room temperature can conveniently be utilized. The reactions can take from a few minutes to several hours; but, in order to insure complete reaction and maximum yields, the reaction mixture can be permitted to stand several days. The reaction is conducted under usual Grignard conditions as understood by those skilled in the art with exclusion of oxygen, moisture, etc.

Generally it is sufficient, in so far as the production of the hexa-substituted benzenes, are concerned, to carry the synthesis to the "Step III" stage. However, it is possible to convert the bis-arene-π-complex compounds to the corresponding hexa-substituted benzenes by reductive cleavage of the bis(hexahydrocarbon substituted) benzene-π-complexes of cobalt (I) with a suitable cleaving agent, e.g., lithium aluminum hydride. Thus the synthesis may be viewed as giving predominantly hexa-substituted benzenes by carrying the reaction past the "Step III" stage and reductively cleaving the π-complex.

Also the cobalt compound left from the reductive cleaving can be reacted with a halogen acid, e.g. hydrochloric acid, to yield cobaltous chloride. The cobaltous chloride can then, if desired, be recycled back for use in "Step II."

The di-covalently bonded, di-hydrocarbon substituted cobalt compounds (as well as their solvates), as discussed previously, possess utility as chemical intermediates and catalysts in the production of bis(arene)π-complexes of cobalt (I) and the cyclized condensation of non-alpha alkynes to hexasubstituted benzenes.

The bis-arene-π-complexes of cobalt (I) (as well as the isolated salts thereof, e.g., the tetraphenylboron, halide, picrate, and Reineckate salts) can be used as a source of hexasubstituted benzenes by reductive cleavage. In this sense they can be considered as chemical intermediates. These π-complexes also demonstrate catalytic activity in the preparation of the hexasubstituted benzenes by cyclization of non-alpha alkynes, and in this sense they can be viewed as catalysts.

We claim:
1. Di-alkyl cobalt solvated with tetrahydrofuran, the alkyl groups having 1 to 20 carbon atoms.
2. Di-aryl cobalt solvated with tetrahydrofuran, in which aryl is selected from the group consisting of phenyl, naphthyl, anthracyl, penanthryl and said groups substituted by lower alkyl.
3. Di-mesitylcobalt solvated with tetrahydrofuran.
4. Bis(arene)π-complexes of cobalt (I), in which arene is selected from the group consisting of benzene, naphthalene, anthracene, phenanthrene and said groups substituted by lower alkyl.
5. Bis(hexaalkylbenzene)π-complexes of cobalt (I), alkyl being lower alkyl.
6. The salts of bis(arene)π-complexes of Co (I) wherein the cationic portion of the salt is the bis(arene) π-complex of Co (I), in which arene is selected from the group consisting of benzene, naphthalene, anthracene, phenanthrene and said groups substituted by lower alkyl and the anionic portion of said salt is an anion selected from the group consisting of: tetraphenyl boron, Reineckate, picrate, and halide anions.
7. Bis(hexamethylbenzene)-Co (I) tetraphenyl boron.
8. Bis(hexamethylbenzene)-Co (I) picrate.
9. Bis (hexamethylbenzene)-Co (I) Reineckate.
10. Bis(hexamethylbenzene)-Co (I) chloride.
11. The method of preparing hexa-hydrocarbon substituted benzenes and bis(arene)π-complexes of cobalt (I) which comprises contacting Grignard reagent, cobaltous halide, and di-hydrocarbon substituted acetylene.
12. The method of condensing non-alpha alkynes to hexa-hydrocarbon substituted benzenes which comprises contacting di-covalent, di-hydrocarbon cobalt with di-hydrocarbon substituted acetylene.
13. The method of preparing hexa-substituted benzenes from bis(hexa-substituted arene)π-complexes of cobalt (I) which comprises reductively cleaning the bis(hexa-substituted arene)π-complex of cobalt (I) to yield the hexa-substituted benzenes.
14. The method of preparing hexa-substituted benzenes from bis(hexa-substituted arene)π-complexes of cobalt (I) which comprises contacting the bis(hexa-substituted arene)π-complex of cobalt (I) with a reductive cleaving agent to yield hexa-substituted benzenes, wherein the reductive cleaving agent is lithium aluminum hydride.

15. The method of preparing bis (arene)π-complexes of cobalt (I) which comprises reacting di-covalent, di-hydrocarbon cobalt with non-alpha alkynes.

16. The method of preparing bis(hexamethyl benzene) cobalt (I) which comprises reacting di-mesitylcobalt with 2-butyne.

17. The method of preparing hexa-hydrocarbon substituted benzenes which comprises reacting di-covalent, di-hydrocarbon substituted cobalt with di-hydrocarbon substituted acetylene to yield hexa-substituted benzenes and bis(hexa-substituted arene)π-complexes of cobalt (I), and reductively cleaving the bis(hexa-substituted arene)π-complexes of cobalt (I) to yield hexa-substituted benzenes.

18. The method of claim 17 wherein lithium aluminum hydride is employed as the reductive cleaving agent.

19. The method of preparing di-covalent, di-hydrocarbon substituted cobalt wherein both hydrocarbon substituents are monovalent which comprises contacting a monovalent hydrocarbon Grignard reagent with cobaltous halide in the presence of tetrahydrofuran.

20. The method of preparing dimesitylcobalt which comprises contacting mesitylmagnesium bromide with cobaltous chloride in the presence of tetrahydrofuran.

21. The method of preparing diphenylcobalt which comprises contacting phenylmagnesium bromide with cobaltous chloride in the presence of tetrahydrofuran.

22. The method of preparing bis(arene)π-complexes of cobalt (I) and hexa-substituted benzenes which comprises contacting cobaltous halide, magnesium, hydrocarbon halide, and di-hydrocarbon substituted acetylene.

23. The method of preparing (A) di-covalent, di-hydrocarbon substituted cobalt wherein both hydrocarbon substituents are monovalent, (B) bis(arene)π-complexes of cobalt (I), and (C) hexahydrocarbon substituted benzene, which method comprises the steps of contacting a monovalent hydrocarbon Grignard reagent with cobaltous halide in the presence of tetrahydrofuran to yield di-covalent, di-hydrocarbon substituted cobalt solvated with tetrahydrofuran; and contacting di-covalent, di-hydrocarbon cobalt with di-hydrocarbon substituted acetylene to yield bis(hexahydrocarbon substituted arene)π-complexes of cobalt (I) and hexahydrocarbon substituted benzenes.

References Cited in the file of this patent

UNITED STATES PATENTS

| | | |
|---|---|---|
| 2,680,756 | Pauson | June 8, 1954 |
| 2,846,449 | Banford et al. | Aug. 5, 1958 |
| 2,852,533 | Brenner et al. | Sept. 16, 1958 |
| 2,912,449 | Sweeney | Nov. 10, 1959 |
| 2,951,885 | Wade | Sept. 6, 1960 |
| 2,953,610 | Zeiss et al. | Sept. 20, 1960 |
| 2,954,414 | Hoff et al. | Sept. 27, 1960 |
| 2,980,741 | Zeiss et al. | Apr. 18, 1961 |
| 2,988,563 | Brantley | June 13, 1961 |

OTHER REFERENCES

Fischer et al.: Z. Naturforschung, vol. 10B (1955), pages 665–8.

Birmingham et al.: Naturwissenschaften, vol. 42 (1955), page 96.

Bergmann: Chem. of Acetylene and Related Compounds (Interscience, 1948), page 80.

Kharasch: J. Org. Chem., vol. 10 (1945), pp. 292–7.

Kharasch: J. Org. Chem., vol. 10 (1945), pp. 298–306.

Spacu: Chem. Abstracts, vol. 30 (1936), column 2873 (abstracts of Bol. soc. stiinte cluj, vol. 8 (1935), pp. 286–95).

UNITED STATES PATENT OFFICE
CERTIFICATE OF CORRECTION

Patent No. 3,187,013            June 1, 1965

Harold H. Zeiss et al.

It is hereby certified that error appears in the above numbered patent requiring correction and that the said Letters Patent should read as corrected below.

Column 4, lines 5 to 29, in Equation III, for that portion of the formula reading

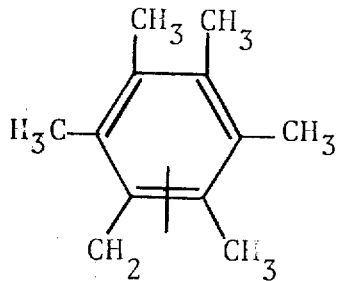     read     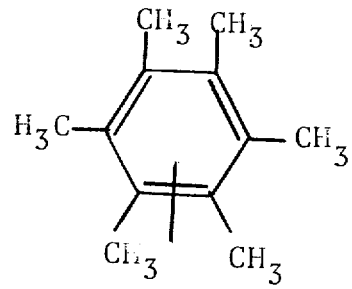

column 5, lines 58 to 65, the formula should appear as shown below instead of as in the patent:

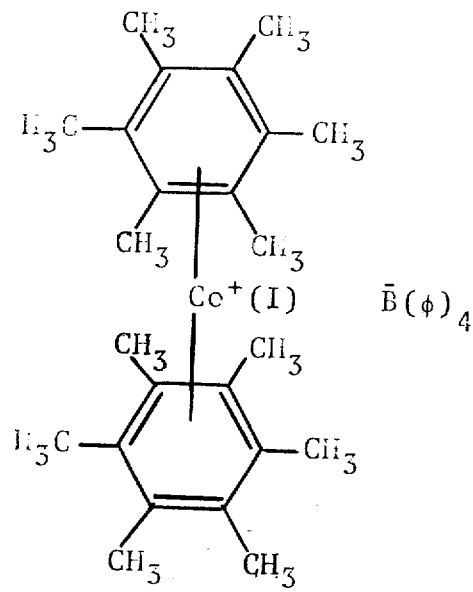

3,187,013 column 8, line 71, for "substiuted" read -- substituted --;
line 72, for "cleaning" read -- cleaving --.

Signed and sealed this 2nd day of November 1965.

(SEAL)
Attest:

ERNEST W. SWIDER
Attesting Officer

Edward J. BRENNER
Commissioner of Patents